(12) United States Patent
Yu

(10) Patent No.: US 7,735,916 B2
(45) Date of Patent: Jun. 15, 2010

(54) DETACHABLE SADDLE AND PAD-REPLACEABLE SADDLE SET

(75) Inventor: Tsai-Yun Yu, Taichung Hsien (TW)

(73) Assignee: International Bicycle Products Corporation, Tachia, Taichung Hsien (TW)

(*) Notice: Subject to any disclaimer, the term of this patent is extended or adjusted under 35 U.S.C. 154(b) by 15 days.

(21) Appl. No.: 12/112,323

(22) Filed: Apr. 30, 2008

(65) Prior Publication Data

US 2009/0108643 A1 Apr. 30, 2009

Related U.S. Application Data

(60) Provisional application No. 60/982,942, filed on Oct. 26, 2007.

(30) Foreign Application Priority Data

Feb. 4, 2008 (TW) ............... 97104177 A

(51) Int. Cl.
B62J 1/00 (2006.01)
(52) U.S. Cl. ............... 297/215.16; 297/195.1
(58) Field of Classification Search ............ 297/195.1, 297/195.12, 195.13, 214, 215.16, 440.14
See application file for complete search history.

(56) References Cited

U.S. PATENT DOCUMENTS

| 594,316 | A | | 11/1897 | Basch | |
| 5,533,783 | A | * | 7/1996 | Harms et al. ............ | 297/195.13 |
| 6,019,422 | A | * | 2/2000 | Taormino et al. ........ | 297/195.1 |
| 7,059,673 | B1 | * | 6/2006 | Lee ............ | 297/195.1 |
| 7,192,085 | B2 | * | 3/2007 | Lee ............ | 297/195.1 |
| 7,448,664 | B2 | * | 11/2008 | Karube et al. ............ | 296/65.03 |
| 7,506,925 | B2 | * | 3/2009 | Rutherford ............ | 297/195.1 |
| 2004/0051352 | A1 | * | 3/2004 | Bigolin ............ | 297/214 |
| 2006/0284458 | A1 | | 12/2006 | Lee | |
| 2008/0001445 | A1 | * | 1/2008 | Lee ............ | 297/201 |
| 2008/0179925 | A1 | * | 7/2008 | Chuang ............ | 297/214 |
| 2008/0197680 | A1 | * | 8/2008 | Chuang ............ | 297/214 |
| 2008/0211272 | A1 | * | 9/2008 | Segato ............ | 297/195.1 |

FOREIGN PATENT DOCUMENTS

| DE | 3231305 A1 * | 2/1984 |
| WO | WO 2006/120630 | 11/2006 |
| WO | WO 2007/031943 | 3/2007 |

OTHER PUBLICATIONS

European Search Report dated Nov. 18, 2009.

* cited by examiner

*Primary Examiner*—Peter R. Brown
(74) *Attorney, Agent, or Firm*—Thomas, Kayden, Horstemeyer & Risley

(57) ABSTRACT

A detachable saddle and a pad-replaceable saddle set are provided. The detachable saddle comprises a base, a pad and a fastening device, wherein the base has a top surface, the pad has a bottom surface, and the fastening device, disposed between the top surface of the base and the bottom surface of the pad, is adapted to detachably assemble and substantially form a cushion space between the base and the pad. The pad-replaceable saddle set comprises said base, said fastening device and a plurality of pads, wherein each pad is assembled with the base to form a complete detachable saddle. Thereby, cyclists may conveniently and readily detach and replace the pads of the pad-replaceable saddle set.

20 Claims, 4 Drawing Sheets

DETACHABLE SADDLE AND PAD-REPLACEABLE SADDLE SET

This application claims priorities to Taiwan Patent Application No. 097104177 filed on Feb. 4, 2008, and U.S. Provisional Application No. 60/982,942 filed on Oct. 26, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a saddle, and more particularly, relates to a detachable saddle and a pad-replaceable saddle set thereof.

2. Descriptions of the Related Art

In modern society, bicycle riding is not only used as a means of transportation but also for recreation and exercise. As a result, the requirements of the various parts of a bicycle have become more stringent. In particular, the saddle is of utmost importance to a rider. This is because the saddle provides the largest contact area between the rider and the bicycle and accommodates for a relatively high stress. Thus, the comfort, profile and weight of the saddle have become important factors that influence the purchase decision of users.

Different riders have different saddle preferences depending on the various riding environments, e.g., different road conditions, riding purposes or locations. For example, a rider that participates in road racing may prefer a light weight saddle with lower wind resistance and better air permeability for heat dissipation. In the case, the pad of the saddle that comes directly into contact with the rider's crotch should preferably be made of a carbon fiber composite with a plurality of ventilation holes formed thereon. On the other hand, the saddle of a bicycle used for general leisure purposes preferably features appropriate softness, cushioning capability and appropriate air permeability, so that the rider can sit comfortably on the saddle for a long period of time. For off-road riding, the rider will prefer a saddle with high air permeability and better cushioning capability. In addition, because there are different physiological structures of riders, saddles of different widths will be needed to accommodate each rider.

As previously described, the saddles have to be replaced according to various riding situations anywhere and anytime. On the other hand, because the top cover of the pad bears the greatest stress and frictional force, the saddle must be replaced as a whole once the top cover is worn. However, because of the lack of necessary skills and associated tools for replacing and adjusting the saddle, most riders go to the bicycle shop for repair, which can be costly and inconvenient.

Thus, a single saddle is not capable of meeting the diversified needs of a rider, and it is complex in procedure and uneconomical to replace the entire saddles to cater for the diversified needs. In view of this, it is highly desirable in the art to provide a detachable saddle that allows an easy and rapid detachment and replacement, and a pad-replaceable saddle set including a plurality of pads with different designs, widths, and styles.

SUMMARY OF THE INVENTION

One objective of this invention is to provide a detachable saddle that can be readily and rapidly detached and replaced by the rider depending on the different requirements and provide an appropriate cushioning capability.

Another objective of this invention is to provide a pad-replaceable saddle set having the aforementioned saddle structure and a plurality of different pads, so that the rider can chose various pad styles, widths, colors and profiles to replace original or worn pads easily.

The detachable saddle of this invention comprises a base, a pad and a fastening device. The base has a top surface, while the pad has a bottom surface. The fastening device is disposed between the top surface of the base and the bottom surface of each pad. The fastening device is adapted to detachably fasten the base and the pad together and substantially space the base and the pad apart from each other to form a cushion space therebetween. The pad-replaceable saddle set of this invention comprises the aforementioned base, the aforementioned fastening device, and a plurality of pads. The pads have a substantially same longitudinal dimension yet different transverse dimensions. As a result, the pads can be coupled to the base and fastened thereto by the fastening device. The base and each of the pads are detachably assembled together by the fastening device to form a complete detachable saddle respectively.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
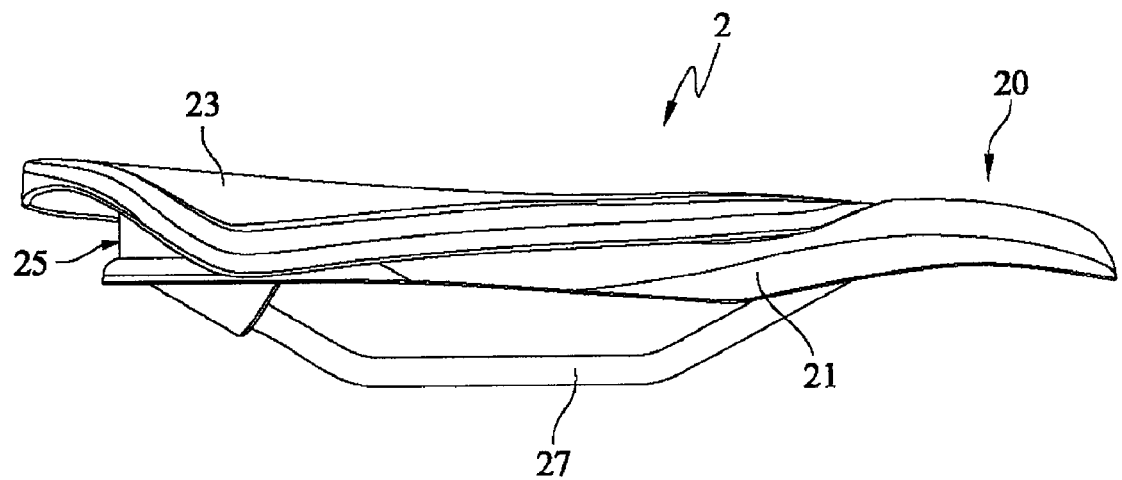
FIG. 1 illustrates the side view of a detachable saddle of this invention.
Figure 2:
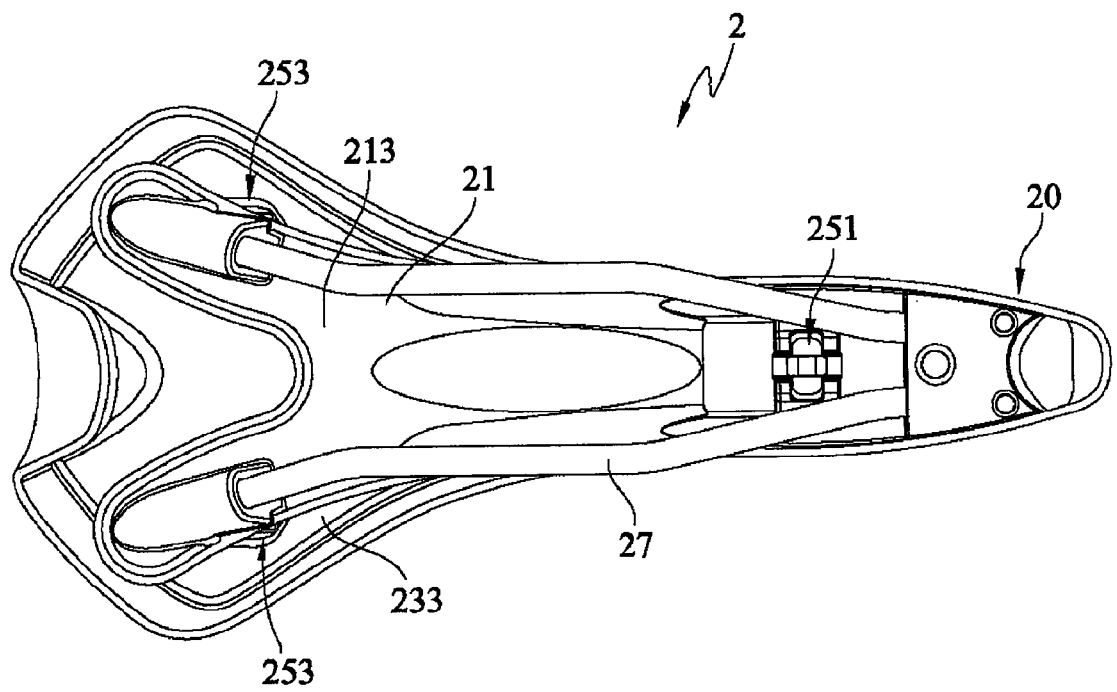
FIG. 2 illustrates the bottom view of a detachable saddle of this invention.

FIG. 1 and FIG. 2 illustrate a detachable saddle 2 as the first embodiment of this invention. The saddle 2 comprises a base 21, a pad 23 and a fastening device 25. The fastening device 25 is disposed between the base 21 and the pad 23, and adapted to detachably fasten the base 21 and the pad 23 together and substantially space the pad 23 and the base 21 apart from each other to form a cushion space therebetween. As shown in FIG. 1, the cushion space substantially keeps a distance between the base 21 and the pad 23, which allows slight fluctuations of the pad 23 to provide a cushioning effect when the rider is cycling. The assembled detachable saddle 2 defines a nose portion 20 at the front thereof, which is adapted to support the rider's crotch, so that the rider may sit on the detachable saddle 2 comfortable.

Figure 3:
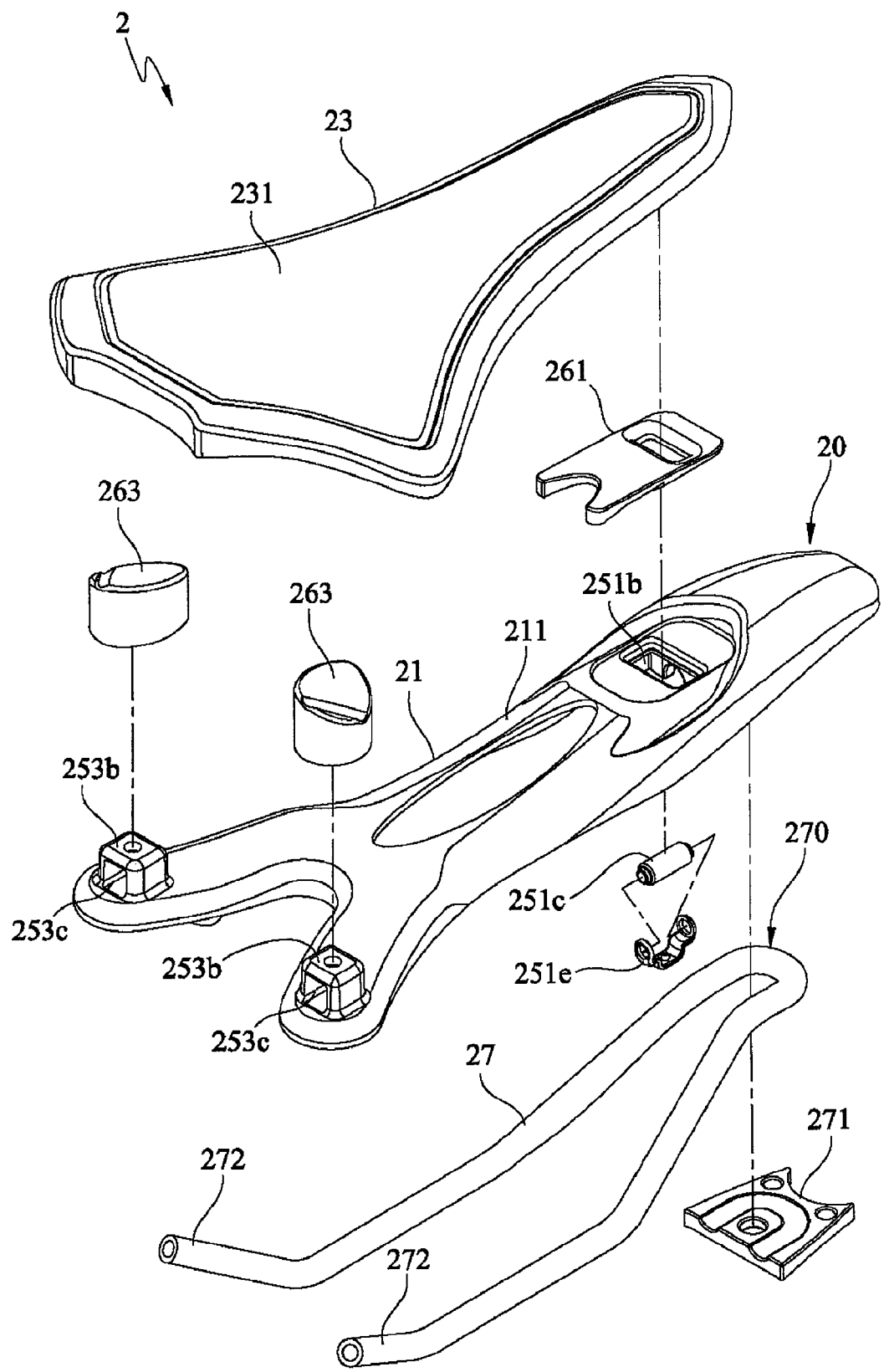
FIG. 3 illustrates the top assembly view of a detachable saddle of this invention.
Figure 4:
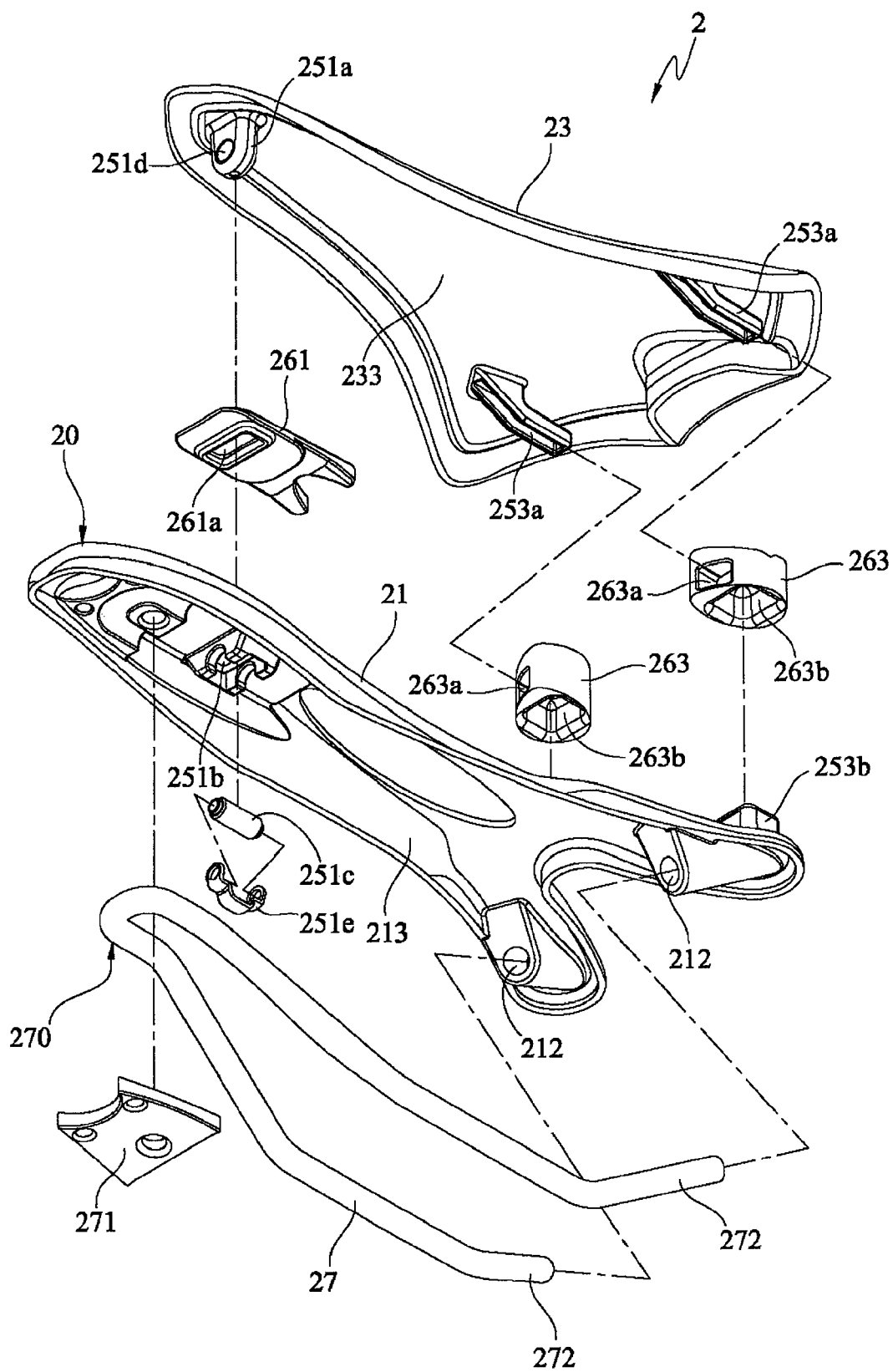
FIG. 4 illustrates the bottom assembly view of a detachable saddle of this invention.

The base 21 comprises a rail 27 disposed on a bottom surface 213 of the base 21, by which the detachable saddle 2 is fixed to a bicycle body. As shown in FIG. 3 and FIG. 4, a front end 270 of the rail 27 is fixed onto the bottom surface 213 at the nose portion 20 of the base 21 by a clamp 271 and a plurality of screws. Two rear ends 272 of the rail 27 are inserted into two insert-holes 212 formed on the bottom surface 213 of the base 21. In this way, the rail 27 is secured to the bottom surface 213 of the base 21. The base 23 may be made of a material selected from the group consisting of titanium, titanium-based alloy, magnesium, magnesium-based alloy, high strength aluminum, aluminum-based alloy and carbon fiber composites. The base 23 is preferably made of a magnesium-based alloy, while the pad 23 is preferably made of a carbon fiber composite, so that the detachable saddle 2 of this invention is provided with high strength and light weight. In other embodiments, a soft cover wrapping the pad 23 may be further incorporated to provide more comfort.

With reference to FIGS. 1 to 4, the fastening device 25 comprises a front fastening assembly 251, a rear fastening assembly 253 and an elastomer assembly. In this embodiment, the front fastening assembly 251 includes a front projection 251a, a front hole 251b and a pin 251c. The front projection 251a has a hole 251d formed thereon, while the front hole 251b is disposed corresponding to the front projection 251a. The front projection 251a and the front hole 251b, which are disposed on the bottom surface 233 of the pad 23 and the top surface 211 of the base 21 respectively, are detachably assembled together with each other.

The rear fastening assembly 253 includes two rear projections 253a and two embedding portions 253b disposed correspondingly to the two rear projections 253a respectively. The rear projections 253a and the embedding portions 253b are disposed on the bottom surface 233 of the pad 23 and the top surface 211 of the base 21 respectively. Each of the rear projections 253a are substantially extended along an inserting direction of the detachable saddle 2. An embedding hole 253c of each embedding portions 253b is parallel to the rear projections 253a and the inserting direction, so that the rear projections 253a are adapted to be respectively inserted into the embedding holes 253c along the inserting direction and detachably assembled with the embedding portions 253b. Here, the inserting direction may be in a traverse direction or a longitudinal direction of the detachable saddle 2. In this embodiment, the inserting direction is in the longitudinal direction parallel to the length direction of the detachable saddle 2, while the rear projections 253a are extended along the longitudinal direction and inserted into the embedding holes 253c parallel thereto. In this way, the pad 23 is adapted to be readily fastened to and detached from the base 21 to allow the rider to easily replace the pads of various styles and widths or even worn pads easily.

When the front projection 251a is inserted through the front hole 251b, a portion of the hole 251d on the front projection 251a is exposed, through which the pin 251c of the front fastening assembly 251 is adapted to be inserted. A clip 251e is then used to clamp the front projection 251a to secure the front projection 251a and the front hole 251b, thereby securing the base 21 and the pad 23. As shown in FIG. 3 and FIG. 4, the clip 251e is fixed to both ends of the pin 251c to clamp the front projection 251a. However, in other examples, the clip 251e may also be fixed to the pin 251c at only one end and clamp the front projections 251a by the inherent elasticity.

The elastomer assembly is disposed between the base 21 and the pad 23 to space the base 21 and the pad 23 apart from each other to form a cushion space and improve the cushioning capability of the detachable saddle 2. In more detail, the elastomer assembly includes a front elastomer 261 and two rear elastomers 263 corresponding to the two embedding portions 253b. The front elastomer 261 is shaped as a flat piece and has a first through hole 261a corresponding to the front hole 251b. The front projection 251a is sequentially inserted through the first through hole 261a and the front hole 251b, with a portion of the hole 251d exposed for the pin 251c to be inserted therethrough. Each of the two rear elastomers 263 has a second through hole 263a corresponding to the embedding holes 253c and an opening 263b. The rear elastomers 263 enclose the embedding portions 253b via the openings 263b respectively, while the rear projections 253a are inserted into the second through hole 263a and the embedding holes 253c respectively. To provide the elastomer assembly with cushioning capability, the front elastomer 261 and the rear elastomer 263 are made of elastic material which may be selected from the group consisting of Ethylene-vinyl acetate (EVA), Poly Carbonate (PC), rubber, silicone and foam materials, or other elastic materials not stated herein, all of which may accomplish the objective of enhancing the cushioning capability of the detachable saddle 2.

In other examples, the detachable saddle 2 may comprise two or more sets of front fastening assemblies 251, and may also comprise one or more sets of rear fastening assemblies 253. Also, the counts, positions and configurations of the elements included in each of the fastening assemblies are not only limited to what is illustrated above. Therefore, by simply designing the positions thereof according to the available space, the base 21 and the pad 23 can be detachably fastened together. For example, the front projection 251a, the front hole 251b, the rear projections 253a and the embedding portions 253b may also be formed on either the top surface 211 of the base 21 or the bottom surface 233 of the pad 23 depending on the design, in which case the objectives of this invention may also be accomplished by simply forming the corresponding embedding elements on the other one of the top surface 211 of the base 21 and the bottom surface 233 of the pad 23. Additionally, the elastomer assemblies may also be replaced by other means or omitted in other examples.

In application, a series of pads may be used to replace the detachable saddle 2 of this invention. These pads may align with the same base to compose a pad-replaceable saddle set, thus adding product value to the detachable saddle 2. The pad-replaceable saddle set comprises said base 21, a plurality of different pads similar to the aforesaid pad 23, and said fastening device 25. Similarly, the fastening device 25 is disposed between the base 21 and each of the different pads, and adapted to detachably fasten the base 21 and each of the different pads together and substantially space each of the different pads and the base 21 apart from each other to form a cushion space therebetween. Each of the pads and the base 21 are detachably assembled into a complete detachable saddle 2 by the fastening device 25 respectively.

Figure 5:
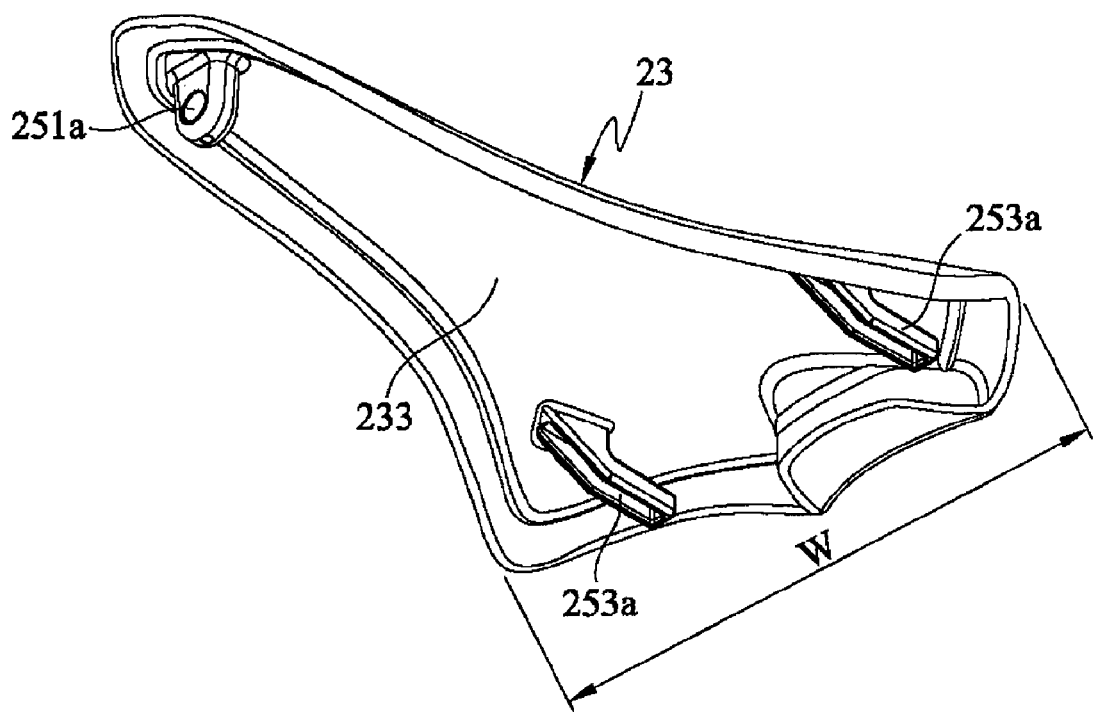
FIG. 5 illustrates the comparison between a narrower pad and a wider pad of this invention.
Figure 5:
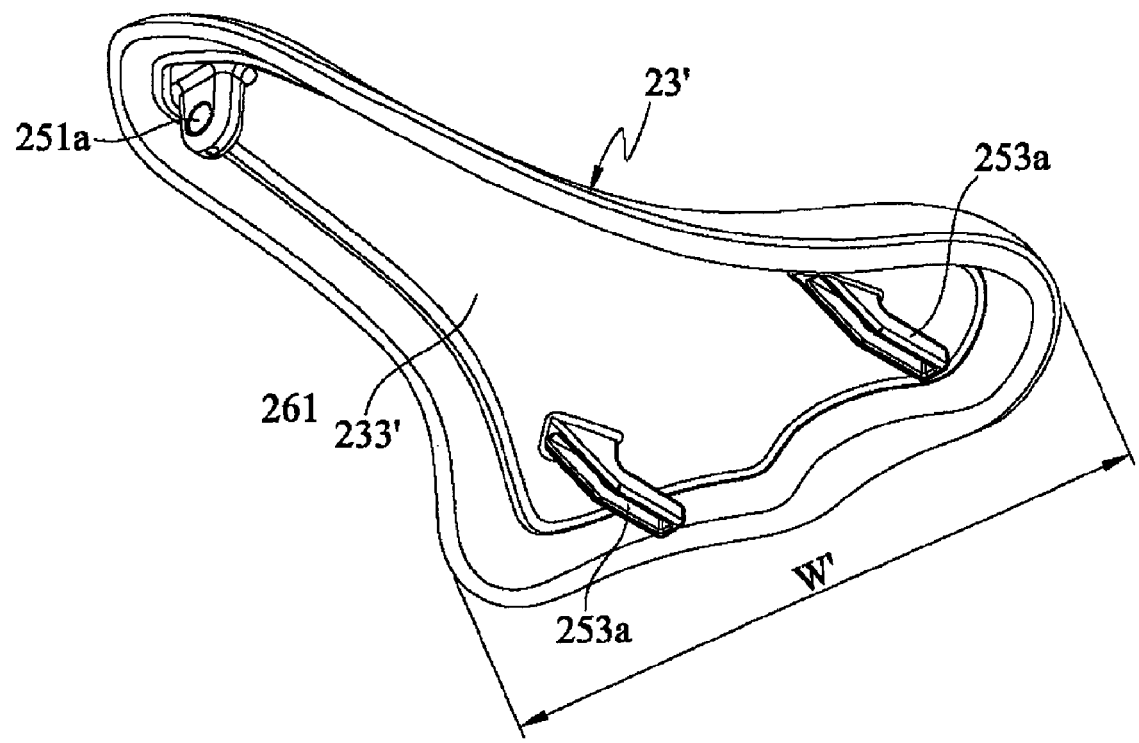

More specifically, as shown in FIG. 5, these different pads 23, 23' have substantially the same fastening devices 25. The cooperating configurations and relative positions between the various parts of the fastening devices 25 are also the same. In this example, the relative position between the front projection 251a and the rear projections 253a formed on the bottom surface 233 of each pad 23, 23' are the same. Likewise, the distance formed between the two rear projections 253a on the bottom surface 233, 233' of each pad 23, 23' are also the same. Hence, the two rear projections 253a on either of the pads 23, 23' are adapted to be inserted into the two embedding portions 253b on the top surface 211 of the base 21 to cooperate with the base 21 to form a complete detachable saddle 2.

In this embodiment, each of the pads has a substantially different traverse dimension. As shown in FIG. 5, the wider pad 23' has a width W' greater than a width W of the narrower pad 23. Consequently, a rider may choose the appropriate pad from the pad-replaceable saddle set with several pad styles according to the width of his/her crotch or riding condition.

Based on the particular design of the aforesaid fastening device, the rider may readily replace the pads of different dimensions (especially traverse dimensions), colors, profiles, designs and materials. The pad-replaceable saddle set includes a variety of pads for the rider's option, e.g., pads with better air permeability, a lighter weight, greater comfort, or better suitableness for the rider's physiology. In this sense, the configurations of the plurality of pads in the pad-replaceable saddle set are not merely limited to the pads 23, 23' depicted in the attached drawings, and the scope of this invention is only limited by what defined in the claims. Other elements of the pad-replaceable saddle set that have the same structure as those of the detachable saddle 2 will not be further described herein.

The concepts of the detachable saddle 2 and the pad-replaceable saddle set of this invention are not only applicable to bicycles, but may also be applied to various other applications that require an easy and rapid replacement of pads according to different requirements. For example, the pads of vehicle seats and indoor seats may also be detachably fastened to a base by a fastening means similar to the fastening device of this invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A detachable saddle, comprising:
    a base having a top surface;
    a pad having a bottom surface; and
    a fastening device, disposed between the top surface of the base and the bottom surface of the pad, the fastening device being adapted to detachably fasten the base and the pad together and substantially space the base and the pad apart from each other to form a cushion space therebetween, wherein the fastening device comprises:
    a rear fastening assembly comprising at least one rear projection and at least one embedding portion, in which the at least one rear projection substantially extends along an inserting direction of the pad, the at least one embedding portion has an embedding hole being parallel to the at least one rear projection, and the at least one rear projection is inserted into the embedding hole along the inserting direction; and
    an elastomer assembly disposed between the base and the pad to form the cushion space, in which the elastomer assembly comprises at least one rear elastomer having an opening and a second through hole corresponding to the embedding hole, the at least one rear elastomer encloses the at least one embedding portion with the opening, and the at least one rear projection is inserted into the second through hole and the embedding holes.

2. The detachable saddle as claimed in claim 1, wherein the fastening device further comprises:
    a front fastening assembly, comprising at least one front projection and at least one front hole, wherein the at least one front projection and the at least one front hole are disposed on one of the top surface of the base and the bottom surface of the pad respectively, and detachably assembled to each other;
    wherein the at least one rear projection and the at least one embedding portion are disposed on one of the top surface and the bottom surface respectively, and detachably assembled to each other.

3. The detachable saddle as claimed in claim 2, wherein
    the front fastening assembly comprises a front projection and a front hole corresponding to the front projection, wherein the front projection and the front hole are disposed on the bottom surface and the top surface respectively; and
    the rear fastening assembly comprises two rear projections and two embedding portions corresponding to the rear projections, wherein the two rear projections and the two embedding portions are disposed on the bottom surface and the top surface respectively.

4. The detachable saddle as claimed in claim 3, wherein the front fastening assembly further comprises a pin, the front projection has a hole, after the front projection is inserted through the front hole, the front projection is adapted to expose at least one portion of the hole, and the pin is inserted through the hole to secure the front projection and the front hole.

5. The detachable saddle as claimed in claim 3, wherein the rear projections are substantially extended along the inserting direction of the pad, the embedding hole of each of the embedding portions is parallel to the rear projections, and the rear projections are adapted to be inserted into the embedding holes respectively along the inserting direction.

6. The detachable saddle as claimed in claim 5, wherein the inserting direction is one of a transverse direction and a longitudinal direction of the detachable saddle.

7. The detachable saddle as claimed in claim 5, wherein the elastomer assembly comprises:
    a front elastomer being shaped as a flat piece and having a first through hole corresponding to the front hole, wherein the front projection is inserted through the first through hole and the front hole; and
    two rear elastomers, each having an opening and a second through hole corresponding to the embedding holes, wherein the rear elastomers enclose the embedding portions with the openings respectively, and the rear projections are inserted into the second through holes and the embedding holes respectively.

8. The detachable saddle as claimed in claim 7, wherein the front elastomer is made of a material selected from the group consisting of Ethylene-vinyl acetate (EVA), Poly Carbonate (PC), rubber, silicone and foam materials.

9. The detachable saddle as claimed in claim 8, wherein the rear elastomers are made of a material selected from the group consisting of Ethylene-vinyl acetate (EVA), Poly Carbonate (PC), rubber, silicone and foam materials.

10. The detachable saddle as claimed in claim 1, further comprising a rail disposed on a bottom surface of the base.

11. The detachable saddle as claimed in claim 1, wherein a material of the pad comprises carbon fiber.

12. The detachable saddle as claimed in claim 1, wherein the base is made of a material selected from the group consisting of titanium, titanium-based alloy, magnesium, magnesium-based alloy, high strength aluminum, aluminum-based alloy and carbon fiber composites.

13. A pad-replaceable saddle set, comprising:
    a base having a top surface;
    a plurality of pads, having a substantially same longitudinal dimension and substantially different transverse dimensions, each of the pads having a bottom surface; and a fastening device, disposed between the top surface of the base and the bottom surface of each of the pads, the fastening device being adapted to detachably fasten the base and each of the pads together and substantially space each of the pads and the base apart from each other to form a cushion space therebetween, wherein the fastening device comprises:
a rear fastening assembly comprising at least one rear projection and at least one embedding portion, in which the at least one rear projection substantially extends along an inserting direction of each of the pads, the at least one embedding portions has an embedding hole being parallel to the at least one rear projection, and the at least one rear projection is inserted into the embedding hole along the inserting direction; and
an elastomer assembly disposed between the base and each of the pads and adapted to form the cushion space, in which the elastomer assembly comprises at least one rear elastomer having an opening and a second through hole corresponding to the embedding hole, the at least one rear elastomer encloses the at least one embedding portion with the opening, and the at least one rear projection is inserted into the second through hole and the embedding holes;
wherein the base and each of the pads are detachably assembled together by the fastening device to form a complete detachable saddle.

14. The pad-replaceable saddle set as claimed in claim 13, wherein the fastening device further comprises:
a front fastening assembly comprising a front projection and a front hole corresponding to the front projection, wherein the front projection and the front hole are disposed on the bottom surface and the top surface respectively;
wherein the rear fastening assembly comprising two rear projections and two embedding portions corresponding to the two rear projections, wherein the two rear projections and the two embedding portions are disposed on the bottom surface and the top surface respectively; and
a distance defined between the rear projections on the bottom surface of each of the pads is substantially the same.

15. The pad-replaceable saddle set as claimed in claim 14, wherein the front fastening assembly further comprises a pin, the front projection has a hole and is adapted to expose at least one portion of the hole after the front projection is inserted through the front hole, and the pin is inserted through the hole to secure the front projection and the front hole.

16. The pad-replaceable saddle set as claimed in claim 14, wherein the rear projections are substantially extended along the inserting direction of each of the pads, the embedding hole of each of the embedding portions is parallel to the rear projections, and the rear projections are adapted to be inserted into the embedding holes respectively along the inserting direction.

17. The pad-replaceable saddle set as claimed in claim 16, wherein the elastomer assembly comprises:
a front elastomer being shaped as a flat piece and having a first through hole corresponding to the front hole, wherein the front projection is inserted through the first through hole and the front hole; and
two rear elastomers, each having an opening and a second through hole corresponding to the embedding holes, wherein the rear elastomers encloses the embedding portions with the openings respectively, and the rear projections are inserted into the second through holes and the embedding holes respectively.

18. The pad-replaceable saddle set as claimed in claim 17, wherein each of the front elastomer and the rear elastomers is made of a material selected from the group consisting of Ethylene-vinyl acetate (EVA), Poly Carbonate (PC), rubber, silicone and foam materials.

19. The pad-replaceable saddle set as claimed in claim 13, further comprising a rail disposed on a bottom surface of the base.

20. The pad-replaceable saddle set as claimed in claim 13, wherein the base is made of a material selected from the group consisting of titanium, titanium-based alloy, magnesium, magnesium-based alloy, high strength aluminum, aluminum-based alloy and carbon fiber composites.

* * * * *